May 1, 1956 L. Q. WEBBER 2,743,606
HYDRAULIC TENSION SENSING AND INDICATING MEANS
Filed Jan. 28, 1953 2 Sheets-Sheet 1
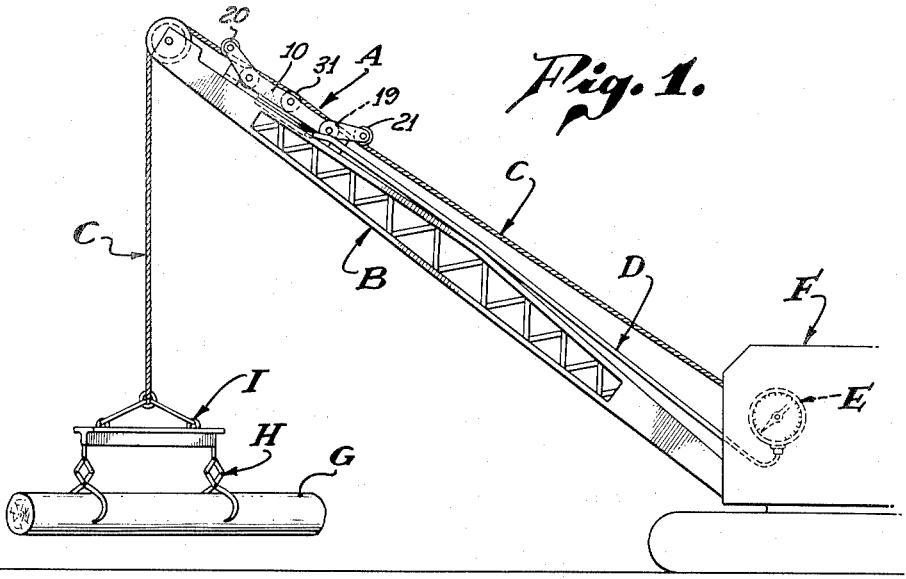
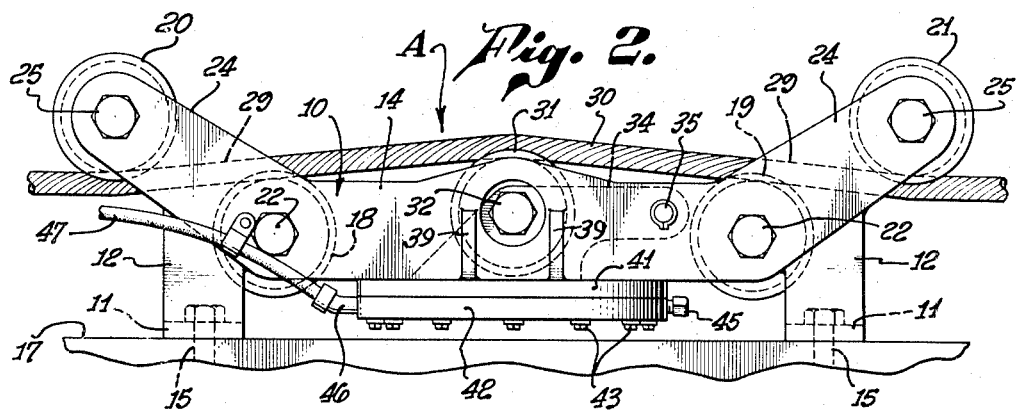
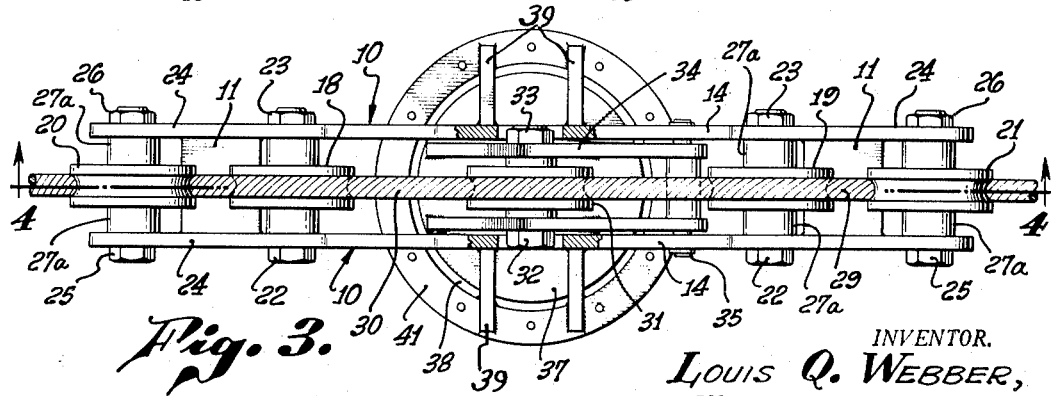
INVENTOR.
LOUIS Q. WEBBER,
BY
Paul A. Weilein
ATTORNEY.

May 1, 1956 L. Q. WEBBER 2,743,606
HYDRAULIC TENSION SENSING AND INDICATING MEANS
Filed Jan. 28, 1953 2 Sheets-Sheet 2
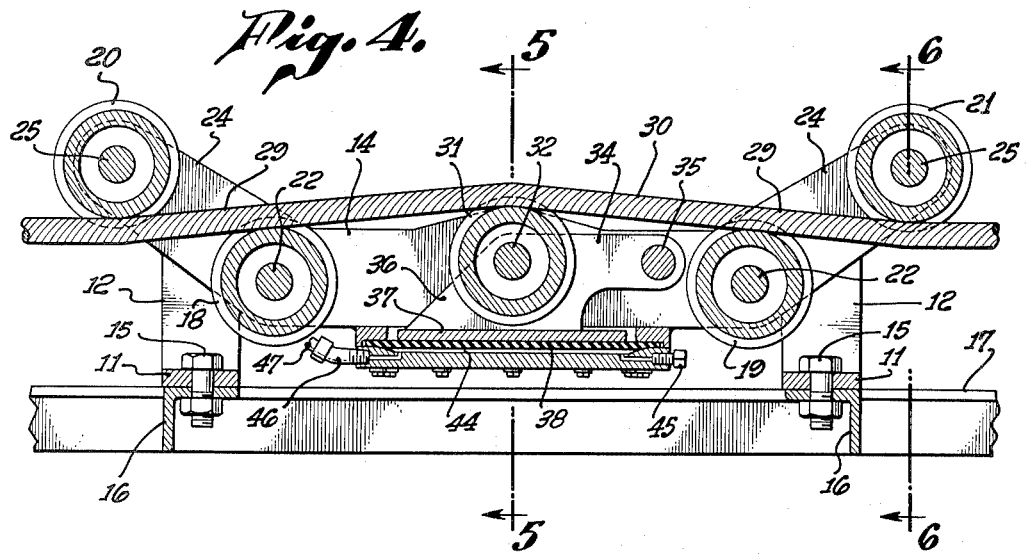
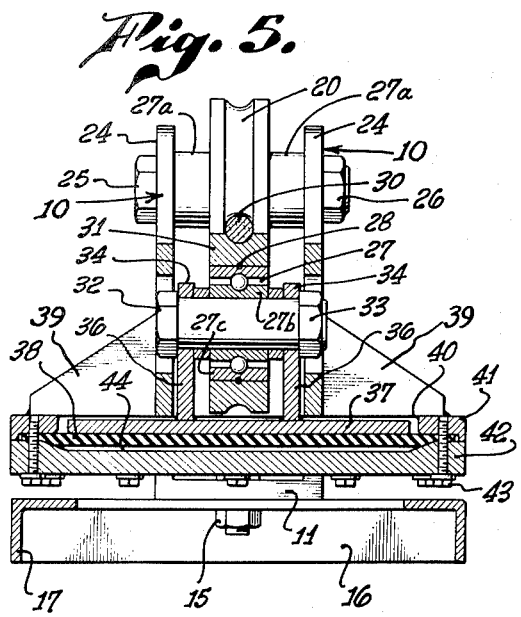
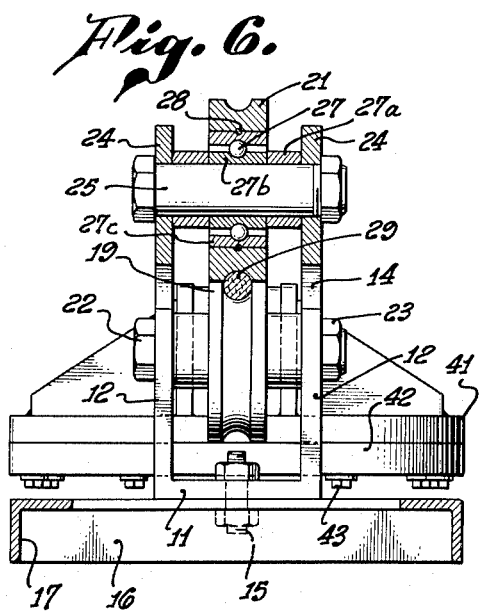
Louis Q. Webber,
INVENTOR.
BY
Paul A. Weilein
ATTORNEY.

United States Patent Office 2,743,606
Patented May 1, 1956

2,743,606

HYDRAULIC TENSION SENSING AND INDICATING MEANS

Louis Q. Webber, Long Beach, Calif., assignor to Martin-Decker Corporation, Long Beach, Calif., a corporation of Delaware Application January 28, 1953, Serial No. 333,685

6 Claims. (Cl. 73—144)

This invention relates generally to tension sensing and indicating means and is particularly applicable to the sensing and indicating of longitudinal stresses applied to load sustaining elements of handling and hoist lines such as ropes, cables, levers and linkages of elevating, suspending, transporting, towing, drilling and analogous equipment.

While various aspects of the primary inventive concept are generally applicable to a wide variety of apparati wherein tension is applied longitudinally of an element which may flex, pivotally move, or become bodily displaced as an incident to the application of such tension therethrough, the present embodiment of the invention is particularly concerned with the sensing and indicating of tension applied through flexible cables as used in hoisting and towing equipment. The present invention is applicable for sensing and indicating the tension of running lines as well as dead lines of the apparatus to which it may be applied.

In sensing and/or indicating devices of this general type, difficulty has been experienced in precluding shock and vibration from affecting the sensing and/or indicating functions. Where the indicating instrument is supported directly or indirectly from the structure through which the flexible tension means is reeved, shock and vibration may render accurate reading of the applied tension impossible, and similarly, where the sensing mechanism involves relatively movable parts supported by such structure, inaccuracies are frequently imparted to the indicating means. Previous devices have also often included mechanical motion transmitting, multiplying or translating means which are not only sensitive to vibration and shock but which are of themselves delicate, readily injured, subject to rapid wear and deterioration and necessitate frequent adjustment. Prior devices have also failed to lend themselves to the inclusion of dampening and response smoothing devices so that a mean, constant and uniform tension is not readily ascertained from any single reading of the indicating device. It has also been difficult to incorporate in a single structure means equally applicable to a running line and a stationary or dead line for the determination of the tension applied therethrough. Problems have also arisen respecting the location of such devices, a compromise between ideal sensing position and the best observation post frequently being necessitated. With these and other kindred problems in mind, the present invention has been conceived and one practical embodiment thereof is here presented as illustrative of one commercially acceptable adaptation of the novel principles involved.

From the foregoing it follows that it is among the primary general objects of the present invention to provide a novel and improved tension sensing and indicating means free from undue vibration and shock responses, adaptable to the inclusion of dampening means, free of intricate mechanical motion transmitting parts and susceptible to the location of the indicating means remote from the sensing means and/or readily observable by a distant operator.

More specifically, it is an object of the invention to provide a novel and improved structure and mounting assembly for a tension sensing device by means of which the transmission of shock and vibration to the tension indicating means is minimized.

Another object is to provide in a device of the character described for the dampening of tension responsive motions so as to provide for a substantially uniform indication of tensions applied.

A further object is to provide for the remote location of a tension indicating device with respect to its sensing means so that such device may be readily observable and free from inaccuracies due to vibration and shock.

Colaterally with the foregoing objectives it is a further object of the invention to provide a device of simple, efficient, effective and economical construction which may be readily installed in devices of conventional design and adapted to accurately sense cable tensions and faithfully indicate such tensions at a suitable selected location not necessarily adjacent the cable or the sensing instrumentality.

The foregoing together with other objects and features of the present invention are accomplished by the provision of a simple unitized structure through which a tension cable may be reeved and which includes a cable engaging pressure controlling mechanism. The construction and arrangement of parts is such that cable tension influences the position of the cable engaging means, and that variations in its position induce pressure variations which are indicated by a pressure responsive gauge calibrated in terms of weight which through support by the cable effect the tension thereof. While various features, functions and characteristics of the invention may be variously embodied in a wide variety of structures, one exemplification of a practical adaptation is deemed to adequately teach the inventive concept and such adaptation is set forth in the following specification and illustrated in the accompanying drawings in which:

Fig. 1 is a side elevation of a lifting crane illustrating the location on the boom thereof of the present tension sensing device, while the tension indicator is illustrated as mounted on the crane cab remote from the sensing device;

Fig. 2 is a detailed side elevation of the sensing device shown in Fig. 1;

Fig. 3 is a top plan view of the unit disclosed in Fig. 2;

Fig. 4 is a longitudinal section taken on the line 4—4 of Fig. 3;

Fig. 5 is a central transverse section taken on the line 5—5 of Fig. 4; and

Fig. 6 is a transverse section taken adjacent one end of the sensing device in a plane parallel to that of Fig. 5, as indicated by the line 6—6 of Fig. 4.

As indicated in Fig. 1 of the drawings, one appropriate application of the present invention is in connection with lifting cranes as used in the lumber industry for lifting and transporting logs. Such cranes frequently are used to raise the logs from their position on the ground where cut and place the same on motor trucks or trailers for delivery to a mill, railroad spur, or water course. Since overloading of such trucks and trailers is dangerous to the equipment and since strict laws impose regulations as to the weights carried by any single truck or trailer, a knowledge of the weight of each log loaded is important. Thus, the present invention is here shown as applied to the crane to give an accurate, immediate and readily observed reading of the weight of each log lifted.

In this application of the invention the sensing unit A is rigidly mounted on the boom B of the crane. The lifting or tension cable C is reeved through the unit A in such manner as to apply pressure variations through an expansible chamber of the unit A which may be translated through a pressure tube D to an indicator or gauge E remotely located, as in the cab F of the crane. In this arrangement the single cable C sustains the entire weight of the log G, which is engaged by the tongs H of the lifting beam I suspended from the cable C. The cable C is thus a running cable through which the entire log weight is transmitted as a tension thereon. As the detailed description of the structure of unit A proceeds, it will be seen that the present invention is equally applicable and effective in application to load sustaining stationary or dead lines and to cables which sustain only a proportionate fraction of the weight lifted.

Referring now to the preferred structural details of the unit A of Fig. 1, as depicted in Figs. 2 to 6 inclusive, it will be seen that the unit comprises a single unitized body assembly rigidly incorporating therein cable guides, cable deflecting means, an expansible chamber and tension responsive means for varying the chamber capacity and hence inducing pressure variations in an associated tube and indicator. Such unitized integral assembly precludes shock and vibration from causing relative movement between parts of the sensing unit A and inaccuracies or indicator fluctuations in response thereto.

This preferred structure comprises a parallel pair of rigid flat side members 10 joined adjacent their ends by intermediate webs 11 to form a unitized body structure having substantially U-shaped end sections as seen more clearly in Fig. 6. Such body may well be cast to form the integral rigid construction desired or assembly of side members 10 and webs 11 may be by welding or bolting should such manufacturing means be found economically advantageous. The webs 11 are joined to the side members 10 through intermediary depending leg extensions 12 so as to space the main central body portions 14 of the side members 10 outwardly from the webs. In securing the unit A to the boom B as in Fig. 1, bolts 15 are passed through the webs 11 and through cross bars 16 extending between the longitudinal rails 17 of the boom B. In this manner, the main body portions 14 of the side members 10 are spaced outwardly of the side rails 17 of the boom and the unit is therefore free of vibration or shock transmitting contact with the boom other than through the mounting thereof by the webs 11.

For guiding the cable C which is to be reeved through the unit, four guide rollers 18, 19, 20 and 21 are provided. Rollers 18 and 19 constitute a parallel aligned pair located between the side members 10 adjacent the opposite ends of the central body portions 14 thereof. The rollers 18 and 19 are rotatably supported on transverse pintle bolts 22 extending between the opposite ends of the central body portions 14 of the side members 10. Securing nuts 23 may be employed for securing the pintle bolts 22 against accidental displacement. The companion pair of rollers 20 and 21 are mounted between integral rigid arms 24 extending upwardly and outwardly from the central body portions 14. Rollers 20 and 21 are mounted between the arms 24 upon pintle bolts 25 similar to the bolts 22, nuts 26 similar to nuts 23 being employed to secure the pintle bolts 25 between the arms 24.

Rollers 18, 19, 20 and 21 are preferably grooved, as indicated. All the rollers are preferably mounted upon anti-friction bearings 27 as shown in Figs. 5 and 6. For insuring proper alignment of a cable in a single plane through the unit, the rollers with the grooves thereof in such single plane are spaced from the side members 14 by spacer sleeves 27a mounted on the pintle bolts 22 and 25 on both sides of the inner race 27b of the bearings 27. Snap rings 28 are employed to maintain the rollers centrally of the outer race 27c of the centralized bearings 27.

As clearly indicated in Figs. 2 and 4, the rollers constitute cooperating pairs 18—20 and 19—21 at each end of the unit. The rollers 20 and 21 are spaced longitudinally outward with respect to their companion rollers 18 and 19. These outer rollers 20 and 21 are also spaced further outward transversely of the unit with respect to the location of rollers 18 and 19. Since the axes of rollers 18 and 19 are thus spaced from the axes of rollers 20 and 21 a distance greater than the diameter of the rollers, ample space is provided between each cooperating pair of rollers to accommodate a cable therebetween of a wide variety of diameters, and thus the unit is universally applicable to equipment utilizing cables of widely varying size. The transverse spacing of the rollers 20 and 21 with respect to the rollers 18 and 19, however, is preferably such that the peripheries of the pair of rollers 18 and 20 as well as the peripheries of rollers 19 and 21 intersect a longitudinally extending plane parallel to the roller axes. Thus, an offset bight is preferably formed in the cable at each pair of cooperating rollers. Such offset of the cable is indicated by the numeral 29, while the intermediate cable portion between the offsets 29 formed therein is indicated by the numeral 30.

While the preferred roller arrangement here shown provides a central intermediate cable section between offset terminal bights, the invention is not necessarily thus limited. The operation of the device requires only that fixed reference points be established for the ends of the intermediate portion 30. Thus, where customary cable tension would maintain the cable in the grooves of either rollers 20 and 21 or 18 and 19 without the aid of the companion pair such as may occur where the cable portion passing through the unit is a dead line rather than a running line as here shown, it may well be that only rollers 18 and 19 or 20 and 21 need be employed. However, by the use of the plural pairs of rollers which form terminal offset bights 29 for the portion 30, not only is the cable maintained against accidental displacement from the unit and/or from engagement in the roller grooves, but vibrations, shocks and surges of the cable are dampened out and the intermediate portion 30 is protected from such motions. In this manner the intermediate portion 30, whether of a running line or a dead line, is subjected only to the tension applied by the cable load and lateral whipping of the cable as well as momentary slacks thereof do not have appreciable effect on the suction 30.

The cable tension sensing element itself includes a fifth roller 31 preferably grooved and mounted on anti-friction bearings in the manner of rollers 18, 19, 20 and 21. The pintle bolt 32 of the roller 31 extends between parallel rocker arms 34 which are pivoted between the side members 10 on a cross pin 35. A nut 32 similar to nuts 23 and 26 may be employed for securing pintle bolt 32 against accidental displacement. From the pivoting cross pin 35 the arms 34 extend to a point intermediate the pairs of rollers 18—20 and 19—21 where the roller 31 is mounted therebetween and thence downwardly toward the plane of the webs 11 forming parallel pressure legs 36 which are unitized by welding or like securement to a pressure plate 37. The pressure plates 37 rests upon and may be secured to a flexible pressure diaphragm 38. From this construction it will be seen that the roller 31 is free to move between and relative to the side members 10 and the unitized supporting structure formed integrally therewith. Such movement is of course in an arcuate path guided by the pivotal movement of its supporting rocker arms 34. It will further be noted that such movement of the roller is translated into vertical movement of the pressure plate 37 which in turn flexes the diaphragm 38 in accurate relation to the movement of the roller 31.

As further noted, particularly from Figs. 2 and 4, the upper or outer portion of the periphery of the roller 31 intersects the plane of the outer portions of the peripheries of the rollers 18 and 19 and the plane of the inner portions of the peripheries of the outer rollers 20 and 21. Hence, when a cable is reeved through the device between the rollers 18, 19, 20 and 21, the intermediate section 30 thereof will bear against the periphery of roller 31 and will be deflected by the roller 31. Thus, the otherwise straight section 30 is offset to produce a variable displaced bight. Since such displacement is resisted by the application of tension on the cable tending to straighten the portion 30, the pressure exerted thereby upon roller 31 will be in exact proportion to the tension produced by the longitudinal load on the cable C.

The pressure plate 37 is shown as being circular and is located within a circular opening 40 formed by an annular expansible chamber supporting member 41. The supporting member 41 is secured to and unitized with the side members 10 by means of transverse webs 39 which are preferably welded between the side members and the member 41 so as to wholly support member 41 and the expansible chamber from the side members as an integral part of the unit. The diaphragm 38 is located below the opening 40 and sealingly engages the inner face of the annular member 41. Below the diaphragm an expansible chamber housing 42 is secured by bolts 43 to the annular member 41, thus forming an expansible chamber 44, the volume of which is varied by movement of the diaphragm 38 under the influence of the roller 31. A plug 45 is threaded through the housing 42 to provide access to the chamber 44 for filling or draining the same and to permit adjustment of the pressure thereof. Opposite the plug 45 a nipple 46 communicates with the chamber and with a pressure tube 47 corresponding to tube D of Fig. 1, so that pressure fluctuations of the chamber may be transmitted to an indicating or recording device such as that shown at E in Fig. 1.

It will be noted that since the chamber forming housing 42 is secured by bolts 43 to the member 41 which in turn is rigidly unitized with the side members 10, webs 11 and the bearings for rollers 18, 19, 20 and 21, vibrations and shocks of the boom B upon which the device may be mounted will be imparted equally to all parts of the unit and thus such shocks or vibrations will not set up relative motions which might otherwise affect the tension registered. It will further be noted that by the use of longitudinally displaced pairs of end rollers the peripheries of which intersect a common longitudinally transverse plane, a vibration and whip dampening offset is imparted at the ends of the intermediate section 30 so that such section may reflect longitudinal tension accurately without response to momentary shocks and surges of the cable load.

Another important feature of the invention is the fact that the mounting of roller 31 provides a direct transmission of thrust from the offset cable portion 30 to the diaphragm 38 so that the diaphragm will respond immediately and directly to movement of the roller 31 and hence the pressure within the expansible chamber 44 will be at all times in direct proportion to the pressure exerted by roller 31 which in turn responds directly to the tension applied to the offset intermediate section 30. Since the mounting of the roller 31 is on arms 34 directly pivoted to the side members 10, any shock or vibration will be imparted to the roller 31 which will thus move in response thereto with the side members 10 and the expansible chamber 44 unitized therewith so as to preclude pressure variations as a result of such shocks or vibrations.

It is also important to note that since tension sensing is converted directly into pressure variations, inaccuracies in the conversion of the tension sensed to pressure changes are precluded. It is equally important to note that since pressure variations are utilized as the means of indicating cable tension, conventional dampening and modifying means may be readily employed in the pressure line to preclude parasitical instrument fluctuation and to multiply or modify instrument responses to the pressure variations. It will of course be further understood that the indicating and/or recording instrument, such as illustrated at G in Fig. 1, may be located wherever desired without incurring inaccuracies in the tension indicated or recorded thereby. Thus, a remote location readily observable but distant from the cable may be elected should occasion so indicate.

From the foregoing it is believed that the construction, assembly and operation of the present invention will be apparent to those skilled in the art to which this invention pertains. The mounting of the unit may of course be by any desired means and to any appropriate stationary part of a load lifting, sustaining or translating mechanism. The cable with respect to which the load is to be sensed may be either a running line sustaining the entire load as shown in Fig. 1, or it may be a running line forming only one strand of a block and tackle arrangement sustaining only a fraction of the entire load; further the cable may be a stationary dead line, the tension of which reflects the load sustained.

Since the cable is reeved through offset pairs of end pulleys, the unit is not necessarily located in the direct and normal line of the cable, since the device by such arrangement of rollers insures the provision of an isolated intermediate area of cable through which the tension is applied and at which such tension may be sensed. It will of course be understood that the inner rollers 18 and 19 provide a normally straight flight of cable therebetween and that the interposition of roller 31 intersecting such flight provides a cable offset. Tension on the cable will of course tend to diminish such offset, thus moving the roller 31 to vary the pressure in the chamber 44. It may also be noted that the intermediate portion 30 need not necessarily be an integral continuation of one cable reeved through the unit but that the same cable tension sensing may be achieved by the use of an intermediate rigid bar, the movements of which toward or from the diaphragm 38 will reflect cable tension, since such bar will be deflected from alignment with the attached cable ends by the roller 31 or its equivalent. Similarly, pivoted lever means may be employed to actuate the diaphragm in response to cable tension should such be desired.

Thus, it will be understood that the inventive concept here illustrated in but one of its practical embodiments may be modified, structural changes may be incorporated and the full use of equivalents may be resorted to without departure from the spirit or scope of the invention as outlined in the appended claims.

I claim:

1. A cable tension sensing and indicating device comprising: an elongated rigid body; cable guiding rollers mounted on said body for engaging one side of the cable to support the body with the major portion thereof opposite the other side of the cable; rollers on said body mounted inwardly of said first mentioned rollers for engaging said other side of said cable; a rocker arm pivoted on said body between said second named rollers; a cable offsetting roller mounted on said rocker arm and extending from one side of said body for engaging said other side of said cable between said second named rollers; an expansible chamber mounted on the other side of said body; said chamber including a flexible diaphragm; and a pressure plate engaged with and operated by said rocker arm; said plate engaging said diaphragm.

2. A cable tension sensing and indicating device comprising: a pair of opposed elongated and rigid body members; cable guiding rollers supported on said body members to engage one side of the cable adjacent the ends of said body members; other rollers on said body members adapted to engage the other side of said cable; a pair of opposed rocker arms supported by and pivotally mounted on said body members between the second named rollers; a cable offsetting roller mounted on said rocker arms in position to contact said other side of the cable; an expansible chamber mounted on said body members; said chamber including a flexible diaphragm; and a pressure plate carried by said rocker arms engaging said diaphragm; the portions of said body members which support said other rollers and said offsetting roller extending lengthwise of the cable between said other side of said cable and said chamber.

3. A cable tension sensing and indicating device comprising: an elongated rigid body; arms on the ends of said body adapted to extend across the cable; cable guiding rollers mounted on said arms for engaging one side of the cable to support said body opposite the other side of said cable; rollers mounted on said body inwardly of said first mentioned rollers to engage said other side of said cable; said rollers being positioned to form offset bights in a cable guided through said device; a rocker arm pivotally mounted on said body between said second named rollers; a cable offsetting roller mounted on said rocker arm for engaging said other side of said cable; an expansible chamber mounted on said body opposite said cable offsetting roller; said chamber including a flexible diaphragm; and a pressure plate carried by said rocker arm engaging said diaphragm.

4. A cable tension sensing and indicating device comprising: a pair of elongated, opposed and rigid body members adapted to extend along one side of the cable; pairs of legs extending from said body members in a direction away from said side of the cable; webs extending between said legs for unitizing said body members; opposed arms extending outwardly from the ends of said body members and terminating opposite the other side of the cable; cable guiding rollers mounted on said arms for engaging said other side of said cable to hold said body members opposite said one side of the cable; cable guiding rollers mounted on said body members inwardly of said first mentioned rollers for engaging said one side of the cable; a rocker arm supported by and pivotally mounted at one end on said body members; a cable offsetting roller mounted on said rocker arm for engaging said one side of said cable; an expansible chamber mounted on the side of said body members remote from said cable; said chamber including a diaphragm; and a pressure plate engaged with the other end of said rocker arm and lying upon said diaphragm.

5. A cable tension sensing and indicating device comprising: a pair of elongated spaced rigid body members; pairs of legs extending from one side of said body members; webs extending between said legs for unitizing said body members; arms extending outwardly from the other side of said body members; cable guiding rollers mounted on the arms for engaging one side of the cable; cable guiding rollers mounted between said body members inwardly of said first mentioned rollers for engaging the other side of the cable; a pair of unitized rocker arms pivotally mounted on said body members; a cable offsetting roller mounted on said rocker arms in position to engage said other side of the cable between the second named rollers; an expansible chamber mounted on the side of said body members remote from said cable; said chamber including a flexible diaphragm; pressure legs carried by said rocked arms; and a pressure plate carried by said pressure legs engaging said diaphragm.

6. A cable tension sensing and indicating device comprising: a pair of spaced elongated rigid body members; pairs of legs extending from one side of said body members adjacent the ends of said body members; webs joining the ends at said legs; opposed arms extending obliquely outwardly from the other side of said body members adjacent the ends of said body members; cable engaging rollers mounted between the outer ends of said arms; cable engaging rollers mounted on said body members inwardly of said first mentioned rollers to engage the side of the cable opposite the side engaged by said first mentioned rollers; a pair of opposed rocker arms pivotally mounted on said body members between said second named rollers; a cable offsetting roller mounted between said rocker arms in position to engage the same side of the cable as said second named rollers; an expansible chamber mounted on and supported by said body members; said chamber including a flexible diaphragm; pressure legs carried by said rocker arms; a pressure plate carried by said pressure legs engaging said diaphragm; said body members being disposed between said cable offsetting roller and said chamber; and webs extending laterally from said body members joining said chamber to said body members.

References Cited in the file of this patent

UNITED STATES PATENTS

| | | |
|---|---|---|
| 1,780,141 | Goldman | Oct. 28, 1930 |
| 2,183,817 | Mathey | Dec. 19, 1939 |
| 2,277,925 | MacClatchie | Mar. 31, 1942 |
| 2,343,229 | Stone | Feb. 29, 1944 |
| 2,452,302 | Hitchen | Oct. 26, 1948 |